No. 773,331. PATENTED OCT. 25, 1904.
C. F. MACKEY.
ELECTRIC BATTERY.
APPLICATION FILED DEC. 11, 1903.
NO MODEL.

Witnesses:
H. B. Hallock.
L. W. Morrison.

Inventor
Charles F. Mackey
By W. Preston Williamson
Atty.

No. 773,331. Patented October 25, 1904.

UNITED STATES PATENT OFFICE.

CHARLES F. MACKEY, OF PHILADELPHIA, PENNSYLVANIA, ASSIGNOR OF TWO-THIRDS TO WILLIAM H. TOMER AND HARRY N. CARTER, OF PHILADELPHIA, PENNSYLVANIA.

ELECTRIC BATTERY.

SPECIFICATION forming part of Letters Patent No. 773,331, dated October 25, 1904.

Application filed December 11, 1903. Serial No. 184,749. (No model.)

*To all whom it may concern:*

Be it known that I, CHARLES F. MACKEY, a citizen of the United States, residing at Philadelphia, county of Philadelphia, and State of Pennsylvania, have invented a certain new and useful Improvement in Electric Batteries, of which the following is a specification.

My invention relates to a new and useful improvement in electric batteries, and has for its object to greatly increase the output, efficiency, and life of what is known as a "primary dry cell."

With these ends in view this invention consists in the details of construction and combination of elements hereinafter set forth and then specifically designated by the claim.

In order that those skilled in the art to which this invention appertains may understand how to make and use the same, the construction and operation will now be described in detail, referring to the accompanying drawings, forming a part of this specification, in which—

Figure 1:
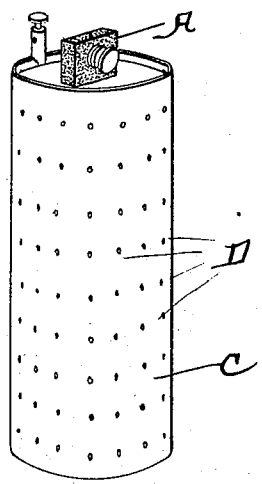
Figure 2:
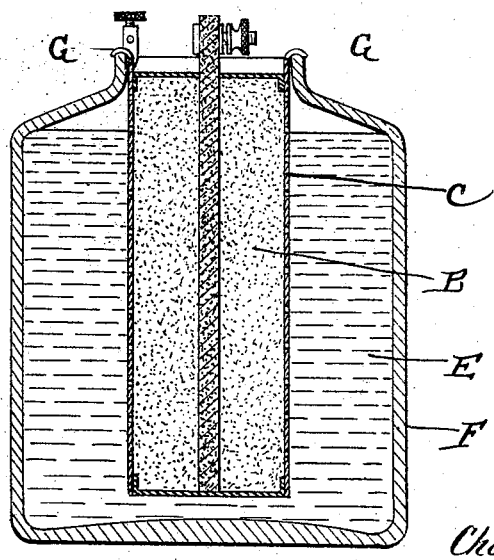

Figure 1 is a perspective view of an ordinary dry cell having a number of holes or openings made in the outer casing in accordance with my improvement, and Fig. 2 a vertical section showing the elements placed within a jar or other casing and surrounded by a suitable electrolyte.

In carrying out my invention as here shown, A represents the carbon or other negative element, surrounded by suitable absorbent and insulating material B, the latter being inclosed in a zinc casing C, said zinc casing forming the positive element of the cell. Heretofore dry cells have been made in this manner; but the electrical output therefrom has been very small relative to the weight of the cell, and the cell quickly becomes exhausted and long before the elements, especially the zinc, have been fully used; but I obviate this serious disadvantage by making perforations or other suitable openings (indicated at D) through the zinc casing C and then immersing the elements in a suitable electrolyte E, contained in any desirable form of jar or receptacle F. By the immersion of the elements in the electrolyte contained in the jar F the electrolyte will be absorbed by the material B, so that the interior and exterior of the casing C will both be brought into action, thereby doubling the zinc surface, and thus increasing the electrical output of the cell.

I have found by experiment that a dry cell which has become entirely exhausted, so as to give no current, may be revived and continue in active service for an exceedingly long time or until the casing C has been consumed, and for bell and like purposes such a battery by actual demonstration will last more than five years.

The upper portion of the zinc casing may be provided with a flange G, adapted to rest upon the upper edge of the mouth of the receptacle F, and thus support the elements within said receptacle.

Of course I do not wish to be limited to the exact construction here shown, as the gist of my invention rests in the broad idea of the use of a carbon or similar negative element surrounded by absorbent material contained by a casing of zinc or like material, the latter being immersed in a suitable electrolyte contained in a suitable receptacle, communication being had between the exterior and interior of the casing.

Having thus fully described my invention, what I claim as new and useful is—

In an electric battery, a zinc positive element forming a casing with a perforated wall, flanges at its upper end forming supporting-hooks, a carbon negative element in the casing, a receptacle to which the casing is fitted, the flanges of said casing engaging the edge of the receptacle and an electrolyte in the receptacle.

In testimony whereof I have hereunto affixed my signature in the presence of two subscribing witnesses.

CHARLES F. MACKEY.

Witnesses:
H. B. HALLOCK,
L. W. MORRISON.